M. BARABASZ.

BUCKLE.

APPLICATION FILED JULY 20, 1908.

12,855. Reissued Sept. 22, 1908

Inventor

Witnesses

Edwin L. Bradford

G. Ferdinand Vogt.

Mieczyslaw Barabasz

By Mann & Co.

Attorneys

UNITED STATES PATENT OFFICE.

MIECZYSLAW BARABASZ, OF BALTIMORE, MARYLAND.

BUCKLE.

No. 12,855 Specification of Reissued Letters Patent. Reissued Sept. 22, 1908.

Original No. 877,035. dated January 21, 1908, Serial No. 349,034. Application for reissue filed July 20, 1908. Serial No. 444,548.

*To all whom it may concern:*

Be it known that I, MIECZYSLAW BARABASZ, a citizen of the United States, residing at Baltimore, in the State of Maryland, have invented certain new and useful Improvements in Buckles, of which the following is a specification.

This invention relates to improvements in buckles formed from a single piece of metal.

One of the difficulties heretofore experienced in one piece stamped up buckles is that the teeth being stationary, and inclined more or less inwardly, particularly on that bar over which the adjustments are being constantly made, the travel of the strap or web over said teeth in one direction causes the extremities or pointed ends of said teeth to scratch or scrape the material of which the strap is formed and thereby break or injure the threads to such extent as to become a serious objection. Another criticism advanced concerning one piece buckles is that the threading of the straps over the bars has been such as to form a considerable outwardly-projecting hump on one of the cross-bars over which both strap ends pass, one over the other.

My present invention therefore has among its objects to provide an improved construction and arrangement of teeth which will permit the strap to pass over the teeth without injury to the strap and another object is to provide a construction of buckle whereby the hump beyond the outer surface of the buckle plate above referred to, will be practically eliminated.

The invention is illustrated in the accompanying drawing in which,—

Figure 1:
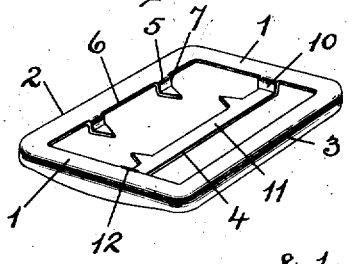
Figure 2:
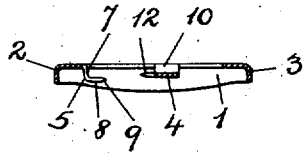
Figure 3:
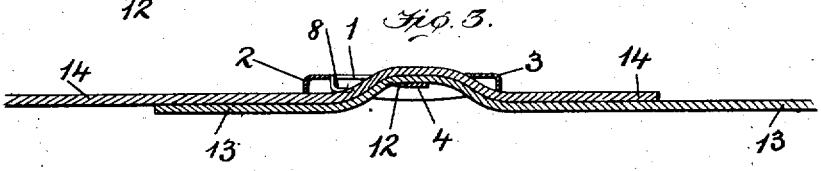
Figure 4:
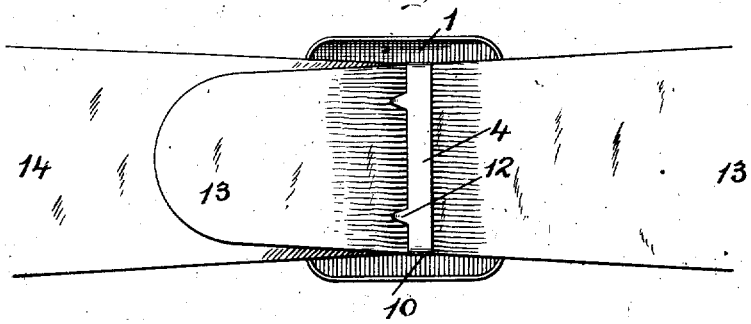
Figure 5:
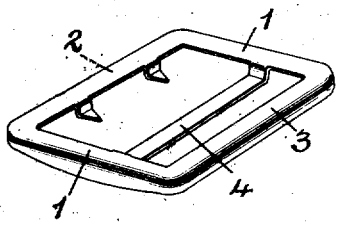
Figure 6:
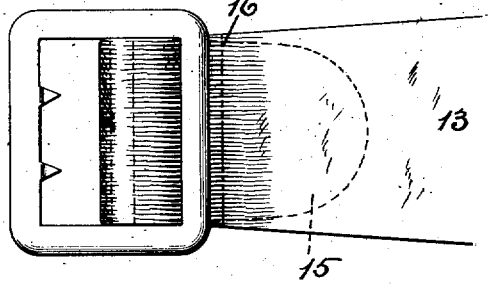

Figure 1 illustrates a perspective view of the improved buckle. Fig. 2, shows a cross-sectional view of the same. Fig. 3, illustrates a similar view of the buckle with the straps threaded therethrough. Fig. 4, shows a rear view of the buckle and straps. Fig. 5, illustrates a perspective view of a buckle like that shown in Fig. 1 with the exception that the teeth on the inner bar have been omitted, and Fig. 6, shows a face view of the buckle illustrated in Fig. 5 with one strap threaded around the depressed toothless bar and stitched.

Referring to the drawing it will be seen that the buckle is formed in a single piece, preferably of sheet metal which enables the formation of the buckle by a die. This buckle, as illustrated has the two side bars, 1, and end bars, 2, and, 3. It may have a plurality of cross-bars connecting the side bars and extending parallel with and between the end bars, but in the simplest form, such as illustrated, there is a central cross-bar, 4, connecting the two side bars, 1.

The end bar, 2, is provided with my improved construction of teeth, 5. These teeth are formed at the inner edge, 6, of the end bar, 2, and have an inwardly-extending portion, 7, which project beyond the inner side of the buckle plate and a laterally-extending portion, 8, which projects in a direction toward and confronts the cross-bar, 4. The lateral portions of these teeth have their extremities, 9, pointed so as to readily engage the strap material when the latter is drawn in a direction from the pointed ends toward the end bar, 2, as will presently be explained.

The cross-bar, 4, has position next to the end bar with the teeth and said cross-bar has inwardly-extending ends, 10, so that the immediate portions, 11, between said ends will lie in a plane depressed from and within the outer surface of the side bars. This cross-bar, 4, may be provided with teeth, 12, which project laterally from the intermediate depressed portion as seen in Fig. 1 or it may be formed merely depressed and without teeth as seen in Fig. 5. By providing the teeth, 12, on said cross-bar the straps may be attached thereto without stitching as the teeth will engage the strap thus avoiding the necessity of stitching whereas, without the teeth one of the strap ends would be passed around said bar and then stitched to prevent disengagement. It will be noted that the side and end bars are provided with inturned edges which form a flange that turns or extends from the inner side of the buckle, and that the teeth on the end bar, and the interposed cross-bar have position in a plane between the outermost surface of the buckle and the inturned edges of the bars.

In threading the straps through the buckle shown in Figs. 1 to 4 inclusive, one strap, 13, passes beneath the end bar, 3, then out and over the depressed cross-bar, 4, where its inner surface is engaged by the teeth, 12, and the end of said strap then projects beneath the end bar, 2. The other strap, 14, is passed first beneath the end bar, 2, then out from beneath the end bar, 3. It will be noted that all appearances of a hump at the point where the two straps pass over the depressed bar, 4, is avoided and that this effect is produced by the depression of the said bar.

The threading of the straps in the buckle shown in Fig. 5 is precisely the same as heretofore described with the exception that the end, 15, of the strap, 13, after passing around the depressed bar is turned toward the end bar, 3, and a row of stitches, 16, is taken through the two thicknesses of said strap to hold it in position around the depressed bar.

It is to be understood that the word teeth as employed in the specification and claims is to be construed to mean one or more teeth, it being immaterial as to how many teeth are employed on any one of the bars of the buckle.

Having thus described my invention what I claim and desire to secure by Letters Patent is,—

1. A buckle of a single plate comprising two side bars, an end bar connecting the two side bars and said end bar having teeth that are bent inwardly therefrom so as to project beneath the inner surface thereof and said teeth then extending laterally and having pointed ends and another bar connecting the side bars and having position in front of the lateral portions of said teeth and lying in a plane between the plane of the lateral portions of the teeth and the plane of the side bars of the buckle plate.

2. A single piece buckle comprising side and end bars having inturned edges, a cross bar interposed between the end bars and having ends that are depressed,—said depressed portions of the cross-bar having position in a plane between the outer surface of the side bars and the said inturned edges, and teeth on one of the end bars.

3. A buckle of a single plate comprising two side bars, an end bar connecting the side bars and having teeth that project beyond the inner surface of the side bars, a cross-bar next to the end bar with the teeth and also having teeth at the edge adjacent the toothed end bar and the points of said teeth on the cross-bar lying within the plane of the side bars and projecting toward the teeth on the end bar.

4. A buckle of a single plate comprising two side bars, two end bars connecting the side bars and a flange projecting from the outer edges of said side bars,—one of the said end bars having teeth that project inwardly and then laterally; a toothed cross bar connecting the side bars and said toothed cross bar being depressed and the depressed portion having position in a plane between the plane of the lateral portion of the teeth on the end bar and the plane of the side bars and the teeth on the depressed cross bar projecting toward the teeth on the end bar.

5. A buckle having two side bars and two end bars provided with inturned edges, a single bar interposed between the two end bars and having both longitudinal edges in the same plane and its outer surface parallel with the outer surface of the side bars and said bar having position between the outermost surface and the inturned edges of the side and end bars, and teeth on one end bar.

6. A buckle formed of a single piece of metal having two side bars and two end bars all having inturned edges, a single bar interposed between the two end bars and having position between the said inturned edges and the outermost surface of the side and end bars and no portion of which projects beyond the outer surface of said bars, and teeth on one end bar which have position in a plane between said inturned edges and the outer surface of the side and end bars.

In testimony whereof I affix my signature in the presence of two witnesses.

MIECZYSLAW BARABASZ.

Witnesses:
CHARLES B. MANN, JR.,
G. FERDINAND VOGT.